United States Patent Office 3,065,160
Patented Nov. 20, 1962

3,065,160
PHOTOPOLYMERIZATION OF VINYL MONOMERS WITH METAL SULFIDES, METAL SELENIDES AND METAL TELLURIDES AS CATALYSTS
Steven Levinos, Vestal, N.Y., assignor to General Aniline & Film Corporation, New York, N.Y., a corporation of Delaware
No Drawing. Filed Aug. 27, 1959, Ser. No. 836,330
20 Claims. (Cl. 204—158)

The present invention relates to the formation of hard solid polymers by photopolymerizing or photocopolymerizing a normally liquid or solid monomeric compound containing a $CH_2=C<$ group while employing as the catalyst for photopolymerization a sulfide, selenide, or telluride of a metal lying between aluminum and mercury in the electromotive series of metals. Such metals include besides aluminum, and mercury, manganese, zinc, chromium, iron, nickel, cobalt, cadmium and many other but exclude the alkali and alkaline earth metals and the precious metals.

Application Serial No. 715,528 filed February 17, 1958 by Steven Levinos discloses that monomeric compounds containing a vinyl group can be photopolymerized by radiations having a wave length from $10^{-1}$ to $10^{-10}$ centimeters to yield solid products while employing as the catalyst radiation-sensitive silver compounds.

Application Serial No. 731,538 but Steven Levinos and Fritz W. H. Mueller suggests that the catalysts for such photopolymerization be light-sensitive silver halide emulsions, whereas application Serial No. 765,275 by the same parties proposes the use as catalysts for such photopolymerization of light-sensitive silver compounds promoted by amphoteric metal oxides.

Application Serial No. 783,725 filed December 30, 1958 by Helene D. Evans, Fritz W. H. Mueller and Steven Levinos suggests the use of metal oxides such as zinc oxide and titanium dioxide with or without promoters as the catalyst in the photopolymerization of monomeric vinyl compounds.

It has now been discovered that normally liquid to solid monomers containing a $CH_2=C<$ group may be photopolymerized in bulk or in coated dry layers with UV light or light of the visible spectrum while employing as a catalyst a sulfide, selenide or telluride of a metal lying between aluminum and mercury in the electromotive series of metals. Such a method of photopolymerization and light-sensitive materials comprising a base coated with a vinyl monomer, the aforesaid catalyst and a colloidal carrier constitute the purposes and objects of the present invention.

The exact mechanism according to which these catalysts induce photopolymerization in bulk or when suitably coated and dried on supports such as metal, paper, glass, film or the like is not completely understood but it is assumed that it involves free radicals in one form or another. In any case, when the sulfides, selenides or tellurides of a metal lying between aluminum and mercury in the electromotive series of metals, for example, zinc sulfide, zinc selenide, zinc telluride, cadmium sulfide, cadmium selenide, cadimum telluride, iron sulfide, mercury sulfide, etc., are dispersed in a suitable matrix, such as gelatin, polyvinyl alcohol, polyvinylpyrrolidone, carboxy methyl cellulose, etc., containing a vinyl monomer and coated on suitable supports and exposed under a pattern, imagewise photopolymerization of the vinyl monomer ensues in such a manner that a sharp photoresist remains after the unpolymerized, unexposed areas are removed by washing with water. Similarly, vinyl monomers in the presence of water and the aforesaid catalysts are photopolymerized in bulk to hard solid monomers in short periods of time when irradiated with UV or visible light. Imagewise photopolymerization involving the aforesaid catalysts is useful in the preparation of photolithographic printing plates, rotogravure cylinders, printed circuits, microfilm and other print materials comparable to silver halide photographic paper and image transfer papers.

The quantity of the aforesaid catalysts used in the photopolymerization may range from about .5 to 20% by weight of the monomer employed. Larger amounts may, of course, be used but no improvement in result follows from the larger amount. As a matter of fact, in bulk photopolymerization, excesses of the aforesaid catalysts will settle out from a water solution and, therefore, such excesses should be avoided.

Any normally liquid to solid compound containing the $CH_2=C<$ group or mixtures thereof may be used in our procedure. Suitable monomers are, for example, acrylamide, acrylonitrile, N-ethanol acrylamide, methacrylic acid, acrylic acid, calcium acrylate, methacrylamide, vinyl acetate, methylmethacrylate, methylacrylate, ethylacrylate, vinyl benzoate, vinyl pyrrolidone, vinylmethyl ether, vinylbutyl ether, vinylisopropyl ether, vinylisobutyl ether, vinylbutyrate, butadiene or mixtures of ethylacrylate with vinyl acetate, acrylonitrile with styrene, butadiene with acrylonitrile and the like.

It is recognized that the molecular weight and hence the ultimate hardness of a vinyl polymer can be increased by utilization during polymerization of a small amount of an unsaturated compound containing at least two terminal vinyl groups each linked to a carbon atom in a straight chain or in a ring. These compounds serve to cross-link the polyvinyl chains and are generally designated as cross-linking agents. Such agaents are described, for example, by Kropa and Bradley in vol. 31, No. 12, of "Industrial and Engineering Chemistry," 1939. Among such cross-linking agents for my purpose may be mentioned N,N'-methylene-bisacrylamide, triallyl cyanurate, divinyl benzene, divinyl ketones and diglycoldiacrylate.

The cross-linking agent is generally employed in an amount ranging from 10 to 50 parts of monomer to each part of the cross-linking agent. It is understood that the greater the quantity of cross-linking agent within such range, the harder the polymer obtained.

Bulk polymerization is usually carried out in a water or organic solvent solution of the monomer. The aforesaid catalysts should be dispersed in the solvent solution of the monomer and if the solution be aqueous, it is recommended that a dispersing agent be employed such as those described in application Serial No. 715,528. This will operate to prevent to a large extent the settling out of the aforesaid catalyst. If an organic solvent system is used, provisions must be for the presence in the system of a small quantity of water, say about .1 to 5% by weight. The water may be added as such as may be supplied by incorporating in the reaction mixture a humectant such as ethylene glycol, glycerin or the like. When these substances are present, say in an amount of a few percent by weight of the mixture, they absorb water from the atmosphere to permit photopolymerization to proceed.

Coatings are prepared by dispersing the catalyst in a colloidal carrier along with the monomeric compound. To facilitate coating, dispersing agents such as saponin or those mentioned in application Serial No. 715,528 may be utilized. A humectant such as glycerin or glycol is preferably added.

The invention will be illustrated by the following examples but it is to be understood that the invention is not restricted thereto.

Example I

The following composition was prepared:

| | G. |
|---|---|
| Acrylamide | 180 |
| N,N'-methylene-bis-acrylamide | 7 |
| Water | 120 |

To 2 cc. of this composition were added about 25 mg. of zinc sulfide. The mixture confined in a test tube was exposed to light of a 500 watt tungsten lamp at a distance of 30". Photopolymerization to a solid mass ensued in a period of 10.75 minutes.

Example II

To 2 cc. of the composition of Example I were added 50 mg. of zinc sulfide. The mixture was confined to a test tube and exposed to the light of a 500 watt tungsten lamp at a distance of 30". Photopolymerization ensued in a period of 8.5 minutes.

Example III

To 2.5 cc. of the composition of Example I were added 25 mg. of zinc sulfide activated with copper and cobalt. The mixture was confined to a test tube and exposed to the light of a 375 watt tungsten lamp at a distance of 8". Photopolymerization ensued in a period of 3 minutes.

Example IV

To 2.5 cc. of the composition of Example I were added 25 mg. of zinc selenide. The mixture was exposed to the light of a 375 watt tungsten lamp at a distance of 8". Photopolymerization ensued in a period of 13 minutes

Example V

To 2 cc. of the composition of Example I were added 25 mg. of cadmium sulfide. The mixture was exposed to the light of a 500 watt tungsten lamp at a distance of 30". Photopolymerization ensued in a period of 8.25 minutes.

Example VI

To 2 cc. of the composition of Example I were added 50 mg. of cadmium sulfide. The mixture was exposed to the light of a 500 watt tungsten lamp at a distance of 30". Photopolymerization ensued in 5.75 minutes.

Example VII

To 2.5 cc. of the composition of Example I were added 25 mg. of zinc cadmium sulfide activated by means of silver and copper. The mixture was exposed to the light of a 375 watt tungsten lamp at a distance of 8". Photopolymerization ensued in 3.75 minutes.

Example VIII

To 2.5 cc. of the composition of Example I were added 25 mg. of cadmium selenide. The mixture was exposed to the light of a 375 watt tungsten lamp at a distance of 8". Photopolymerization ensued in a period of 7.75 minutes.

Example IX

The following composition was prepared and will hereinafter be referred to as A–5:

| | G. |
|---|---|
| Acrylamide | 180 |
| N,N'-methylene-bis-acrylamide | 7 |
| Water | 120 |

Coatings were prepared on a hardened gelatin layer on film using the following formulation:

| | | |
|---|---|---|
| 10% gelatin | ml | 450 |
| Zinc sulfide | g | 2.5 |
| A–5 | ml | 90 |
| Saponin 8% | ml | 7.2 |
| Glycerin | ml | 3 |

A number of coatings were prepared and exposed for different time intervals to a tungsten lamp (375 watt) at a distance of 30". Photopolymerization took place in a few minutes. The relief was obtained by washing away the unpolymerized parts.

Example X

The procedure was the same as in Example IX except that 2.5 g. of zinc cadmium sulfide was used in place of the zinc sulfide. In this case, photopolymerization required less than 5 minutes.

Example XI

The procedure was the same as in Example IX except that zinc selenide was substituted for the zinc sulfide. Photopolymerization took place in 10 minutes.

Example XII

The procedure was the same as in Example IX except that zinc telluride was substituted for the zinc sulfide. Photopolymerization took place in a few minutes.

Examples XIII, XIV and XV

The precedure was the same as in Example IX except that cadmium sulfide, cadmium selenide or cadmium telluride was used instead of the zinc sulfide. The results obtained by the use of the cadmium salts were the same as those obtained by the use of the zinc salts. Photopolymerization took place in a very few minutes.

Example XVI

A composition was prepared as follows:

| | | |
|---|---|---|
| Acrylic acid | ml | 5 |
| Zinc sulfide | mg | 65 |

By irradiating this composition in a test tube as in Example I, photopolymerization ensued in a matter of minutes.

Example XVII

The procedure was the same as in Example XVI except that the zinc sulfide was replaced by the same amount of cadmium selenide. The results were similar to those of Example XVI.

Example XVIII

The procedure was the same as in Example XVI except that the acrylic acid was replaced by 2 ml. of 20% aqueous solution of calcium acrylate and the quantity of zinc sulfide amounted to 10 mg. Photopolymerization ensued in a matter of seconds.

Example XIX

The procedure was the same as in Example IX except that the acrylamide was replaced by calcium acrylate. The results were similar to those obtained in Example IX.

Example XX 10 g. of N-tertiary-butyl acrylamide were dissolved in 30 g. of a 10% aqueous solution of ethyl cellulose and toluene.

1 g. of a dispersing agent—lauryl sulfate—was added and in this oily solution 250 mg. of zinc sulfide were dispersed. The solution was placed in a reactor and exposed using the technique of Example I. Photopolymerization occurred in a matter of minutes yielding a solid hydrophobic polymer.

Example XXI 1 g. of vinyl acetate was dispersed in water to produce a 20% dispersion. To this composition was added .02 g. of zinc sulfide. By irradiating the composition with a 500 watt tungsten lamp at a distance of 5", photopolymerization occurred in a matter of minutes.

Example XXII 5 g. of styrene were dissolved in 2.5 g. of a 10% solution of ethyl cellulose and toluene. After the addition of 3 drops of a 25% solution of lauryl sulfate, .1 g. of zinc selenide were dispersed with the aid of a Waring Blender. The composition was placed in a reactor and exposed to a 500 watt tungsten lamp at a distance of 6″. Photopolymerization occurred in a matter of minutes yielding a solid hydrophobic polymer.

*Example XXIII*

To 2 cc. of methylol acrylamide were added 50 mg. of cadmium sulfide. The resulting composition was irradiated with a 500 watt tungsten lamp at a distance of 30″. Photopolymerization of the mass to a solid product ensued in a period of 16 minutes.

*Example XXIV*

To 2 cc. of A–5 were added 50 mg. of zinc telluride. Photopolymerization to a solid mass ensued in 3½ minutes when the mixture was exposed to the light of a 375 watt tungsten lamp at a distance of 8″.

Modifications of the invention will occur to persons skilled in the art. Thus, in lieu of any of the monomers mentioned in the examples, I may use any of the vinyl monomers mentioned above. Similarly, any of the catalysts mentioned above other than those of the examples may be employed. I, therefore, do not intend to be limited in the patent granted except as necessitated by the appended claims.

I claim:

1. A light-sensitive photographic material comprising a base bearing a colloidal carrier containing a liquid to solid monomer containing a $CH_2=C<$ group and a white light-sensitive catalyst capable of inducing photopolymerization of said monomer to a solid polymer in a matter of minutes and selected from the class consisting of the sulfides, selenides and tellurides of a metal selected from the class consisting of aluminum, mercury, manganese, zinc, chromium, iron, nickel, cobalt and cadmium.

2. A light-sensitive photographic material as recited in claim 1 wherein the catalyst is zinc sulfide.

3. A light-sensitive photographic material as recited in claim 1 wherein the catalyst is zinc selenide.

4. A light-sensitive photographic material as recited in claim 1 wherein the catalyst is zinc telluride.

5. A light-sensitive photographic material as recited in claim 1 wherein the catalyst is cadmium sulfide.

6. A light-sensitive photographic material as recited in claim 1 wherein the catalyst is cadmium selenide.

7. A light-sensitive photographic material as recited in claim 1 wherein the catalyst is cadmium telluride.

8. A light-sensitive photographic material as recited in claim 1 wherein the catalyst is zinc cadmium sulfide.

9. The process of producing high molecular weight, solid polymers from monomeric compounds containing a $CH_2=C<$ group which comprises subjecting such monomer to photopolymerization by exposing the monomer to a light source consisting of light of a wave length of from 3000 to 7000 A. in the presence of a catalyst capable of inducing photopolymerization of said monomer and selected from the class consisting of the sulfides, selenides and tellurides of a metal selected from the class consisting of aluminum, mercury, manganese, zinc, chromium, iron, nickel, cobalt and cadmium.

10. The process as defined in claim 9 in which the catalyst is zinc sulfide.

11. The process as defined in claim 9 in which the catalyst is zinc selenide.

12. The process as defined in claim 9 in which the catalyst is zinc telluride.

13. The process as defined in claim 9 in which the catalyst is cadmium sulfide.

14. The process as defined in claim 9 in which the catalyst is cadmium selenide.

15. The process as defined in claim 9 in which the catalyst is cadmium telluride.

16. The process as defined in claim 9 in which the catalyst is zinc cadmium sulfide.

17. A printing plate comprising a base coated with a light-sensitive photographic emulsion comprising a colloidal carrier containing a normally liquid to solid monomer having a $CH_2=C<$ group and a catalyst capable of inducing photopolymerization of said monomer to a solid polymer in a matter of minutes and selected from the class consisting of the sulfides, selenides and tellurides of a metal selected from the class consisting of aluminum, mercury, manganese, zinc, chromium, iron, nickel, cobalt and cadmium.

18. A printing plate as recited in claim 17 wherein the catalyst is zinc sulfide.

19. A printing plate as recited in claim 17 wherein the catalyst is cadmium selenide.

20. A printing plate as recited in claim 17 wherein the catalyst is zinc cadmium sulfide.

References Cited in the file of this patent

UNITED STATES PATENTS

| | | |
|---|---|---|
| 1,241,738 | Klatte et al. | Oct. 2, 1917 |
| 2,760,863 | Plambeck | Apr. 28, 1956 |

OTHER REFERENCES

Transactions of the Faraday Society, V. 35 (1939), pages 1022, 1023 and 1053.